(12) United States Patent
Broyde et al.

(10) Patent No.: US 9,337,534 B2
(45) Date of Patent: May 10, 2016

(54) METHOD AND DEVICE FOR RADIO RECEPTION USING AN ANTENNA TUNING APPARATUS AND A PLURALITY OF ANTENNAS

(71) Applicant: Samsung Electronics Co., Ltd., Suwon-si, Gyeonggi-do (KR)

(72) Inventors: Frédéric Broyde, Maule (FR); Evelyne Clavelier, Maule (FR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/326,090

(22) Filed: Jul. 8, 2014

(65) Prior Publication Data

US 2014/0323075 A1    Oct. 30, 2014

Related U.S. Application Data

(63) Continuation of application No. PCT/IB2013/058574, filed on Sep. 16, 2013.

(30) Foreign Application Priority Data

Sep. 27, 2012    (FR) .................................... 1202564

(51) Int. Cl.
| | |
|---|---|
| *H04B 1/18* | (2006.01) |
| *H01Q 1/52* | (2006.01) |
| *H04B 7/08* | (2006.01) |
| *H04B 1/26* | (2006.01) |

(52) U.S. Cl.
CPC ................ *H01Q 1/521* (2013.01); *H04B 1/18* (2013.01); *H04B 7/0874* (2013.01)

(58) Field of Classification Search
CPC ....... H01Q 7/005; H03H 3/00; H03H 3/0077; H04B 1/18

USPC .............................. 455/193.1, 193.2; 343/861
See application file for complete search history.

(56) References Cited

U.S. PATENT DOCUMENTS

| 8,059,058 B2 | 11/2011 | Lau et al. |
| 8,102,830 B2 | 1/2012 | Yokoi et al. |

(Continued)

FOREIGN PATENT DOCUMENTS

| FR | 2996067 A1 | 3/2014 |
| WO | 2008030165 A1 | 3/2008 |
| WO | 2014049475 A2 | 4/2014 |

OTHER PUBLICATIONS

R.A. Speciale, "Advanced Design of Phased-Array Beam-Forming Networks", IEEE Antennas & Propagation Magazine, vol. 38, No. 4, pp. 22-34, Aug. 1996.

(Continued)

*Primary Examiner* — Lee Nguyen
(74) *Attorney, Agent, or Firm* — Jefferson IP Law, LLP

(57) ABSTRACT

A receiver for radio communication comprises: four antennas; an antenna tuning apparatus for simultaneously tuning the four antennas, the antenna tuning apparatus comprising adjustable impedance devices, each of the adjustable impedance devices having a reactance at a frequency, the reactance of any one of the adjustable impedance devices being adjustable by electrical means; four single-input and single-output low-noise amplifiers; four analog processing and conversion circuits; a multiple-input signal processing device delivering a signal to a destination, the multiple-input signal processing device delivering a tuning instruction; a tuning control unit, the tuning control unit receiving the tuning instruction from the multiple-input signal processing device, the tuning control unit delivering tuning control signals to the antenna tuning apparatus as a function of the tuning instruction.

18 Claims, 6 Drawing Sheets

(56) References Cited

U.S. PATENT DOCUMENTS

2013/0194139 A1 8/2013 Nickel et al.
2014/0306784 A1* 10/2014 Broyde .................... H04B 1/18
334/78

OTHER PUBLICATIONS

J.W. Wallace et al., "Termination-Dependent Diversity Performance of Coupled Antennas: Network Theory Analysis", IEEE Transactions on Antennas and Propagation, vol. 52, No. 1, pp. 98 to 105, Jan. 2004.

"Dictionnaire CEI multilingue de l'électricité—IEC multilingual dictionary of electricity", published by the "Bureau Central de la Commission Electrotechnique Internationale", 1983.

Search report for French Patent Application No. 12/02564, dated Jun. 24, 2013.

Search report for International Application No. PCT/IB2013/058423, dated Dec. 10, 2013.

R.A. Speciale, "Advanced Design of Phased Array Beam-Forming Networks", Proceedings 2005 IEEE Antennas & Propagation Society Symposium, Jul. 2005.

* cited by examiner

METHOD AND DEVICE FOR RADIO RECEPTION USING AN ANTENNA TUNING APPARATUS AND A PLURALITY OF ANTENNAS

CROSS REFERENCE TO RELATED APPLICATIONS

This is a Continuation Application of PCT application No. PCT/IB2013/058574, filed 16 Sep. 2013, published in English under No. WO 2014/049486, which in turn claims priority to French patent application No. 12/02564 filed 27 Sep. 2012 and entitled "Procédé et dispositif pour la réception radio utilisant un appareil d'accord d'antenne et une pluralité d' antennes", both of which are incorporated herein by reference.

FIELD OF THE INVENTION

The invention relates to a method for radio reception using an antenna tuning apparatus and a plurality of antennas. The invention also relates to a receiver for radio communication using an antenna tuning apparatus and a plurality of antennas. The received radio signals may carry information of any nature, for instance signals for speech transmission and/or image transmission (television) and/or data transmission. The received radio signals may be used for any type of operation, for instance broadcasting, bidirectional point-to-point radio communication or radio communication in a cellular network.

PRIOR ART

FIG. 1 shows an example of a block diagram of a modern receiver for radio communication using a plurality of antennas simultaneously. Each of the 3 antennas (1) is coupled to the input of a single-input and single-output low-noise amplifier (4). The output of each single-input and single-output low-noise amplifier (4) is connected to the input of an analog processing and conversion circuit (5) which outputs digital signals. The output of each analog processing and conversion circuit (5) is connected to an input of a multiple-input signal processing device (6), whose output is connected to the destination (7). For instance, in the case of a superheterodyne receiver, each analog processing and conversion circuit (5) may implement the following main steps: frequency conversion, filtering and amplification of the intermediate frequency signal, demodulation and analog-to-digital conversion of the I and Q signals. For example, the multiple-input signal processing device (6) may implement the following main steps: OFDM demodulation of each input signal, space-time decoding, channel decoding, source decoding. In the case where the receiver of FIG. 1 is used with transmitters using also a plurality of antennas, the space-time decoding step is sometimes called MIMO decoding.

The impedance matrix $Z_{ANT}$ of an antenna array is non-diagonal when the interactions between the antennas are non-negligible, the absolute values of the non-diagonal entries of the impedance matrix being generally larger when the antennas are placed closer to each other. It is well known that an antenna array used for receiving radio signals delivers a maximum power when it sees a load presenting an impedance matrix equal to $Z_{ANT}^*$, where $Z_{ANT}^*$ is the hermitian adjoint of $Z_{ANT}$, that is to say a matrix equal to the matrix transpose of the matrix complex conjugate of $Z_{ANT}$. In this case, maximum power transfer occurs.

In the receiver for radio communication using a plurality of antennas shown in FIG. 1, we note that the electrical circuits of the single-input and single-output low-noise amplifiers (4) and of the analog processing and conversion circuits (5) make up as many independent analog channels as there are antennas. Thus, the antenna array sees a load presenting a diagonal impedance matrix. As a consequence, if the antennas form an antenna array in which one or more interactions between the antennas cannot be neglected, a maximum power transfer and/or optimum signal to noise ratios at the inputs of the analog processing and conversion circuits (5) cannot be obtained using the receiver for radio communication using a plurality of antennas shown in FIG. 1, because in this case $Z_{ANT}$ is non-diagonal. This is a first limitation of the receiver shown in FIG. 1, if one wishes to use a compact antenna array.

When the antennas are placed close to each other, the open-circuit voltages received by the antennas become strongly correlated. In the receiver shown in FIG. 1, this phenomenon decreases the transmission rate which can be achieved. This is a second limitation of the receiver shown in FIG. 1, if one wishes to use a compact antenna array.

The article of R. A. Speciale entitled "Advanced Design of Phased-Array Beam-Forming Networks", published in the journal *IEEE Antennas & Propagation Magazine*, vol. 38, No. 4, pages 22 to 34, in August 1996, and the article of J. W. Wallace and M. A. Jensen entitled "Termination-Dependent Diversity Performance of Coupled Antennas: Network Theory Analysis", published in the journal *IEEE Transactions on Antennas and Propagation*, vol. 52, No. 1, pages 98 to 105, in January 2004, show that radio reception using several antennas may be improved if one uses a multiple-input-port and multiple-output-port passive linear matching network, having its input terminals connected to the coupled antennas and its output terminals connected to uncoupled loads, provided the multiple-input-port and multiple-output-port passive linear matching network has appropriate characteristics.

FIG. 2 shows an example of a block diagram of a receiver for radio communication using a plurality of antennas and such a multiple-input-port and multiple-output-port passive linear matching network. Each of the 3 antennas (1) is coupled, directly or through a feeder, to an input port of the multiple-input-port and multiple-output-port passive linear matching network (2). Each of the output ports of the multiple-input-port and multiple-output-port passive linear matching network (2) is connected to the input of a single-input and single-output low-noise amplifier (4). In FIG. 2, the analog processing and conversion circuits (5) and the multiple-input signal processing device (6) are used as in FIG. 1 to produce the signal delivered to the destination (7). In the receiver shown in FIG. 2, it is possible to obtain a maximum power transfer, signal decorrelation and optimum signal to noise ratios at the inputs of the analog processing and conversion circuits (5). However, these wanted results are sensitive to a good fit between the value of $Z_{ANT}$ and the characteristics of the multiple-input-port and multiple-output-port passive linear matching network (2). Unfortunately, the value of $Z_{ANT}$ varies, in particular when the frequency of operation is modified within a frequency band of intended operation, or when the electromagnetic characteristics of the volume surrounding the antennas are modified, for instance a movement of the hand of the user of a portable phone. Thus, the receiver shown in FIG. 2 does not effectively overcome the limitations of the receiver shown in FIG. 1.

An "antenna system" disclosed in the international application number PCT/SE2007/000776 (WO2008/030165) and in the U.S. Pat. No. 8,059,058, both entitled "Antenna system and method for operating an antenna system" and both invented by B. K. Lau and J. Bach Andersen, is primarily defined as comprising N antennas, where N is an integer greater than or equal to 2, and an "impedance matching network", the "impedance matching network" having N input ports and N output ports, the "impedance matching network" being characterized in that it is adaptive.

According to the "Dictionnaire CEI multilingue de l'électricité—IEC multilingual dictionary of electricity" published by the "Bureau Central de la Commission Electrotechnique Internationale" in 1983, the meaning of "adaptive" in electronics is: "whose characteristics are time-variable and result from the optimization of some operational conditions or process". It is important to note that said international application number PCT/SE2007/000776 and U.S. Pat. No. 8,059,058 use the word "adaptive" with two different meanings: the meaning indicated above, and another meaning which seems to be synonymous with "controllable". We are interested in the case where the "impedance matching network" is controlled as a function of a control signal based on at least one channel parameter of the signals received by the antennas. Said at least one channel parameter of the signals received by the antennas is for instance a measure of a correlation between open-circuit voltages delivered by the antennas. Such a channel parameter is not used elsewhere in a radio receiver using the antenna system. Thus, this approach has the major drawback that dedicated circuits and intensive dedicated signal processing are needed to obtain said at least one channel parameter of the signals received by the antennas, which implies added cost and added power consumption.

At a given frequency, an electronic circuit "A" comprising a port having a linear characteristic may be such that this port presents any impedance, that is to say an impedance taking on any value in the set of complex numbers. However, the specialist understands that if the electronic circuit "A" is passive in the meaning of circuit theory, said impedance is such that its real part is positive or zero. In a similar way, an electronic circuit "B" comprising N ports having linear characteristics may be such that these ports present any impedance matrix, that is to say an impedance matrix, denoted by Z, taking on any value in the set of N by N complex matrices. However, the specialist understands that if the electronic circuit "B" is passive in the meaning of circuit theory, said impedance matrix is such that $Z+Z^*$ is an hermitian matrix whose eigenvalues are positive or zero, where $Z^*$ is the hermitian adjoint of Z. Said international application number PCT/SE2007/000776 and U.S. Pat. No. 8,059,058 indicate a desirable property of the "impedance matching network": being "arranged to realize any N by N impedance matrix, as seen from the antenna ports", to obtain a "full implementation of the antenna system". The specialist understands that some of these impedance matrices imply that, when the antennas are used for radio reception, the antennas receive radio-frequency power from the "impedance matching network". Of course, any one of said some of these impedance matrices, denoted by Z, is such that $Z+Z^*$ is an hermitian matrix having one or more strictly negative eigenvalues. The prior art, however, does not teach how to build an "impedance matching network" having this property, and said international application number PCT/SE2007/000776 and U.S. Pat. No. 8,059,058 provide no indication on the type of circuit which can be used to realize the "impedance matching network".

A different approach is disclosed in U.S. Pat. No. 8,102,830 entitled "MIMO Radio Communication Apparatus and Method", invented by A. Yokoi and T. Mitsui. The invention described in this patent is shown in FIG. 3, where 4 antenna systems (10) each have an antenna output which is coupled to the input of a single-input and single-output low-noise amplifier (4). The output of each single-input and single-output low-noise amplifier (4) is connected to the input of an analog processing and conversion circuit (5) which outputs digital signals. The output of each analog processing and conversion circuit (5) is connected to an input of a multiple-input signal processing device (6).

An antenna system (10) typically comprises a main antenna which is connected to the antenna output of the antenna system, and two or more auxiliary antennas. Each of the auxiliary antennas is connected to an adjustable impedance device, each of the adjustable impedance devices having a reactance at a frequency in a frequency band of operation, the reactance of any one of the adjustable impedance devices being adjustable by electrical means. The specialist understands that each of the antenna systems (10) behaves as a single antenna having a radiation pattern which is adjustable by electrical means. This radiation pattern may be referred to as the radiation pattern of said each of the antenna systems (10).

In FIG. 3, the multiple-input signal processing device (6) processes 4 digital signals, each of the digital signals being mainly determined by one and only one of the signals delivered by the antenna outputs, and delivers a signal to a destination (7). The multiple-input signal processing device (6) estimates a channel matrix between a plurality of signals sent by a transmitter and the 4 signals delivered by the antenna outputs of the antenna systems, the multiple-input signal processing device delivering "radiation pattern instructions" as a function of the estimated channel matrix.

The 4 antenna control units (8) shown in FIG. 3 receive the radiation pattern instructions from the multiple-input signal processing device (6), each of the antenna control units (8) delivering one or more "radiation pattern control signals" to one of the antenna systems (10) as a function of the radiation pattern instructions, the reactance of one or more of the adjustable impedance devices of said one of the antenna systems (10) being mainly determined by one or more of the radiation pattern control signals.

The specialist understands that:
the radiation pattern of each of the antenna systems (10) is mainly determined by one or more of the radiation pattern control signals, each of the radiation pattern control signals being determined as a function of said channel matrix;
the channel matrix depends on the radiation pattern of each of the antenna systems (10) and therefore on the radiation pattern control signals;
the receiver shown in FIG. 3 is adaptive in the sense that a nonlinear feedback loop exists, which determines the radiation pattern control signals, and consequently the radiation pattern of each of the antenna systems (10).

In the invention disclosed in said U.S. Pat. No. 8,102,830, the channel matrix is used to compute a channel capacity corresponding to a combination of radiation patterns of the plurality of antenna systems, or equivalently to a combination of radiation pattern control signals. The adaptive process is the following: during a training sequence (also referred to as "pilot sequence"), the channel capacity is computed in this way for a finite set of combinations of radiation pattern control signals, and a combination of radiation pattern control signals providing the greatest channel capacity is selected.

The specialist understands that the invention disclosed in said U.S. Pat. No. 8,102,830 may provide signal decorrelation using an adaptive scheme which may give good results when the frequency of operation is modified within a frequency band of intended operation, or when the electromagnetic characteristics of the volume surrounding the antennas are modified. Unfortunately, this invention cannot be used to obtain a maximum power transfer or optimum signal to noise ratios when the interactions between the antennas are non-negligible, because it requires a wide spacing between the different antenna systems, and it is expensive because, if each antenna system shown in FIG. 3 comprises a main antenna and two auxiliary antennas, 12 antennas are used.

SUMMARY OF THE INVENTION

The purpose of the invention is a method and a receiver for radio reception using an antenna tuning apparatus and a plurality of antennas without the above-mentioned limitations of known techniques.

The method of the invention for radio reception with multiple antennas in a given frequency band, using N antennas, where N is an integer greater than or equal to 2, comprises the steps of:

tuning n antennas among the N antennas, where n is an integer greater than or equal to 2 and less than or equal to N, using an antenna tuning apparatus comprising n antenna ports, m user ports, where m is an integer greater than or equal to 2, and p adjustable impedance devices, where p is an integer greater than or equal to 2m, each of the adjustable impedance devices having a reactance at a frequency in said given frequency band, the reactance of any one of the adjustable impedance devices being adjustable by electrical means, each of the user ports delivering a signal;

processing m digital signals, each of the digital signals being mainly determined by one and only one of the signals delivered by the user ports, to estimate one or more quantities representative of a channel matrix between a plurality of signals sent by a transmitter and the m signals delivered by the user ports, and to deliver a "tuning instruction" as a function of said one or more quantities representative of a channel matrix;

using the tuning instruction to obtain a plurality of "tuning control signals", the reactance of each of the adjustable impedance devices being mainly determined by one or more of the tuning control signals.

A receiver implementing the method of the invention is a receiver for radio reception with multiple antennas using N antennas in a given frequency band, where N is an integer greater than or equal to 2, comprising:

an antenna tuning apparatus for tuning n antennas among the N antennas, where n is an integer greater than or equal to 2 and less than or equal to N, the antenna tuning apparatus comprising n antenna ports, m user ports and p adjustable impedance devices, where m is an integer greater than or equal to 2 and p is an integer greater than or equal to 2m, each of the adjustable impedance devices having a reactance at a frequency in said given frequency band, the reactance of any one of the adjustable impedance devices being adjustable by electrical means, each of the user ports delivering a signal;

a multiple-input signal processing device processing m digital signals, each of the digital signals being mainly determined by one and only one of the signals delivered by the user ports, the multiple-input signal processing device estimating one or more quantities representative of a channel matrix between a plurality of signals sent by a transmitter and the m signals delivered by the user ports, the multiple-input signal processing device delivering a "tuning instruction" as a function of said one or more quantities representative of a channel matrix;

a tuning control unit, the tuning control unit receiving the tuning instruction from the multiple-input signal processing device, the tuning control unit delivering a plurality of "tuning control signals" to the antenna tuning apparatus, the tuning control signals being determined as a function of the tuning instruction, the reactance of each of the adjustable impedance devices being mainly determined by one or more of the tuning control signals.

The user ports present, at said frequency in said given frequency band, an impedance matrix referred to as "the impedance matrix presented by the user ports", and the antenna ports see, at said frequency in said given frequency band, an impedance matrix referred to as "the impedance matrix seen by the antenna ports". It is assumed that said antenna tuning apparatus behaves, at any frequency in the given frequency band, with respect to its antenna ports and user ports, substantially as a passive linear device. More precisely, said antenna tuning apparatus behaves, at any frequency in the given frequency band, with respect to the n antenna ports and the m user ports, substantially as a passive linear (n+m)-port device. As a consequence of linearity, it is possible to define "the impedance matrix presented by the user ports". As a consequence of passivity, the antenna tuning apparatus does not provide amplification.

An adjustable impedance device is a component comprising two terminals which substantially behave as a passive linear two-terminal circuit element, and which are consequently fully characterized by an impedance which may depend on frequency, this impedance being adjustable. An adjustable impedance device may be adjustable by mechanical means, for instance a variable resistor, a variable capacitor, a network comprising a plurality of capacitors and one or more switches or change-over switches used to cause different capacitors of the network to contribute to the reactance, a variable inductor, a network comprising a plurality of inductors and one or more switches or change-over switches used to cause different inductors of the network to contribute to the reactance, or a network comprising a plurality of open-circuited or short-circuited stubs and one or more switches or change-over switches used to cause different stubs of the network to contribute to the reactance. We note that all examples in this list, except the variable resistor, are intended to provide an adjustable reactance.

An adjustable impedance device having a reactance which is adjustable by electrical means may be such that it only provides, at said frequency in said given frequency band, a finite set of reactance values, this characteristic being for instance obtained if the adjustable impedance device is:

a network comprising a plurality of capacitors or open-circuited stubs and one or more electrically controlled switches or change-over switches, such as electro-mechanical relays, or microelectromechanical switches (MEMS switches), or PIN diodes or insulated-gate field-effect transistors (MOSFETs), used to cause different capacitors or open-circuited stubs of the network to contribute to the reactance; or a network comprising a plurality of coils or short-circuited stubs and one or more electrically controlled switches or change-over switches used to cause different coils or short-circuited stubs of the network to contribute to the reactance.

An adjustable impedance device having a reactance which is adjustable by electrical means may be such that it provides, at said frequency in said given frequency band, a continuous set of reactance values, this characteristic being for instance obtained if the adjustable impedance device is based on the use of a variable capacitance diode; or a MOS varactor; or a microelectromechanical varactor (MEMS varactor); or a ferroelectric varactor.

The antenna tuning apparatus may be such that the reactance of any one of the adjustable impedance devices has, at said frequency in said given frequency band, if the impedance matrix seen by the antenna ports is equal to a given diagonal impedance matrix, an influence on the impedance matrix presented by the user ports. This must be interpreted as meaning: the antenna tuning apparatus may be such that, at said frequency in said given frequency band, there exists a diagonal impedance matrix referred to as the given diagonal impedance matrix, the given diagonal impedance matrix being such that, if the impedance matrix seen by the antenna ports is equal to the given diagonal impedance matrix, then the reactance of any one of the adjustable impedance devices has an influence on the impedance matrix presented by the user ports.

Each of the antenna ports is intended to be coupled, directly or through a feeder, to one of said n antennas among the N antennas.

Consequently, the method of the invention for radio reception with multiple antennas in a given frequency band, using N antennas, where N is an integer greater than or equal to 2, may comprise the steps of:
tuning n antennas among the N antennas, where n is an integer greater than or equal to 2 and less than or equal to N, using an antenna tuning apparatus comprising n antenna ports, m user ports, where m is an integer greater than or equal to 2, and p adjustable impedance devices, where p is an integer greater than or equal to 2m, each of the adjustable impedance devices having a reactance at a frequency in said given frequency band, the reactance of any one of the adjustable impedance devices having, at said frequency in said given frequency band, if the impedance matrix seen by the antenna ports is equal to a given diagonal impedance matrix, an influence on the impedance matrix presented by the user ports, each of the antenna ports being coupled, directly or through a feeder, to one of said n antennas among the N antennas, the reactance of any one of the adjustable impedance devices being adjustable by electrical means, each of the user ports delivering a signal;
processing m digital signals, each of the digital signals being mainly determined by one and only one of the signals delivered by the user ports, to estimate one or more quantities representative of a channel matrix between a plurality of signals sent by a transmitter and the m signals delivered by the user ports, and to deliver a "tuning instruction" as a function of said one or more quantities representative of a channel matrix;
using the tuning instruction to obtain "tuning control signals", the reactance of each of the adjustable impedance devices being mainly determined by one or more of the tuning control signals.

Also, the receiver implementing the method of the invention is a receiver for radio reception with multiple antennas using N antennas in a given frequency band, where N is an integer greater than or equal to 2, which may comprise:
an antenna tuning apparatus for tuning n antennas among the N antennas, where n is an integer greater than or equal to 2 and less than or equal to N, the antenna tuning apparatus comprising n antenna ports, m user ports and p adjustable impedance devices, where m is an integer greater than or equal to 2 and p is an integer greater than or equal to 2m, each of the adjustable impedance devices having a reactance at a frequency in said given frequency band, the reactance of any one of the adjustable impedance devices having, at said frequency in said given frequency band, if the impedance matrix seen by the antenna ports is equal to a given diagonal impedance matrix, an influence on the impedance matrix presented by the user ports, each of the antenna ports being coupled, directly or through a feeder, to one of said n antennas among the N antennas, the reactance of any one of the adjustable impedance devices being adjustable by electrical means, each of the user ports delivering a signal;
a multiple-input signal processing device processing m digital signals, each of the digital signals being mainly determined by one and only one of the signals delivered by the user ports, the multiple-input signal processing device estimating one or more quantities representative of a channel matrix between a plurality of signals sent by a transmitter and the m signals delivered by the user ports, the multiple-input signal processing device delivering a "tuning instruction" as a function of said one or more quantities representative of a channel matrix;
a tuning control unit, the tuning control unit receiving the tuning instruction from the multiple-input signal processing device, the tuning control unit delivering "tuning control signals" to the antenna tuning apparatus, the tuning control signals being determined as a function of the tuning instruction, the reactance of each of the adjustable impedance devices being mainly determined by one or more of the tuning control signals.

The specialist understands that said one or more quantities representative of a channel matrix may for instance be an estimation of instantaneous channel state information (CSI), which may for instance be obtained using a training sequence (or pilot sequence) and/or a decision directed channel estimation. In the case of a training sequence, known signals are sent by a transmitter and the channel matrix is estimated using the knowledge of the signals sent by the transmitter and of the noisy signals delivered by the user ports.

The specialist understands that:
the antenna tuning is mainly determined by several tuning control signals, each of the tuning control signals being determined as a function of said one or more quantities representative of a channel matrix;
like the channel matrix, said one or more quantities representative of a channel matrix depend on the antenna tuning and therefore on the tuning control signals;
the method of the invention and the receiver implementing the method of the invention are adaptive in the sense that a nonlinear feedback loop exists, which determines the tuning control signals, and consequently the impedance matrix presented by the user ports.

The specialist understands that the multiple-input signal processing device can also be used to deliver a signal to a destination.

The specialist understands that a SIMO or MIMO channel exists between the plurality of signals sent by the transmitter and the m signals delivered by the output ports. The specialist understands that said one or more quantities representative of a channel matrix may for instance be used to determine a quantity representative of a channel capacity. The specialist understands that this channel capacity is the capacity of said SIMO or MIMO channel. In this case, said tuning instruction may for instance be determined as being the tuning instruction which, among a set of possible tuning instructions, produces a quantity representative of a channel capacity which corresponds to the largest channel capacity.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 4:
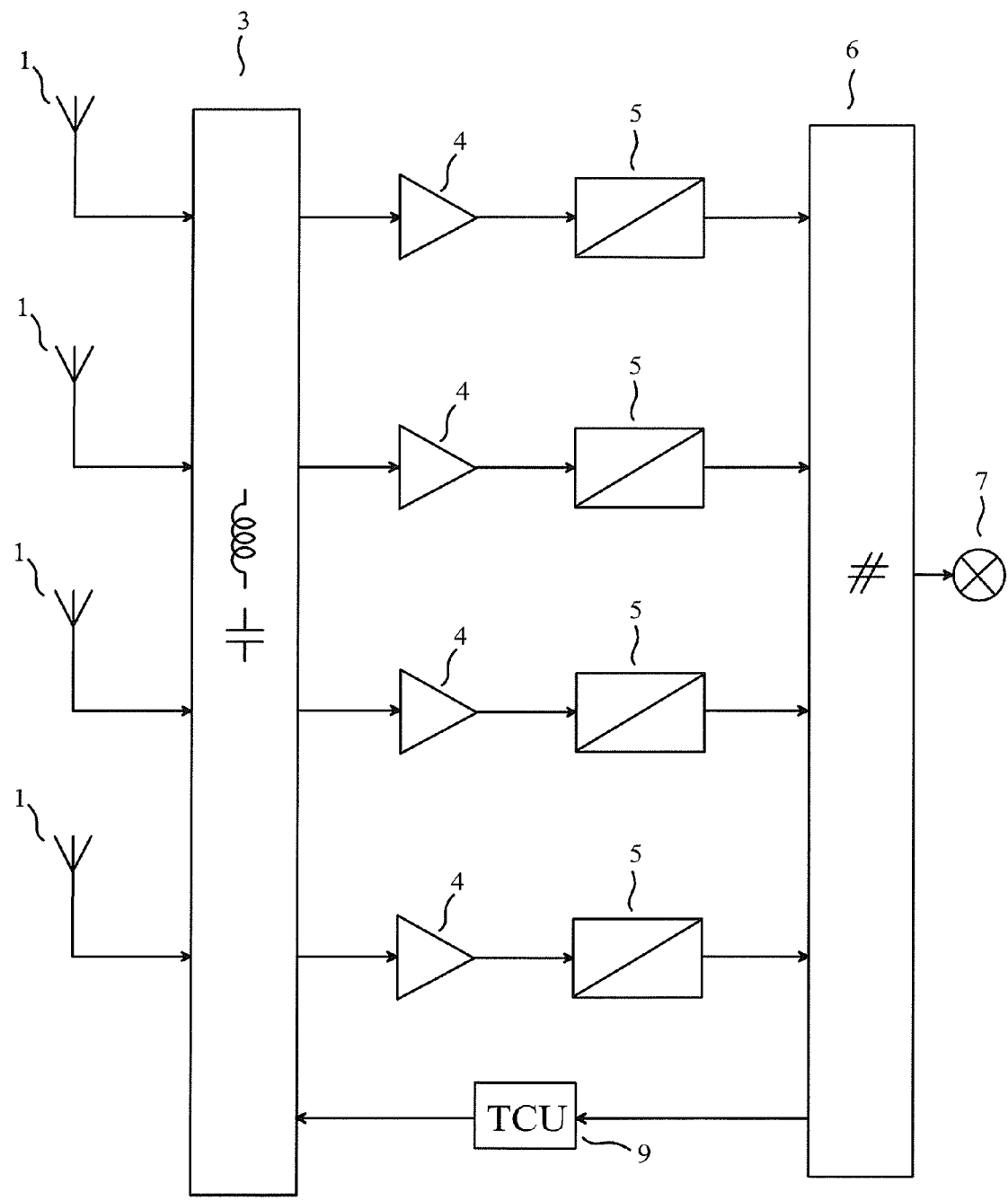
FIG. 4 shows the block diagram of a receiver for radio communication using an antenna tuning apparatus and a plurality of antennas (first embodiment)

As a first embodiment of a device of the invention, given by way of non-limiting example, we have represented in FIG. 4 the block diagram of a receiver for radio communication using an antenna tuning apparatus and a plurality of antennas, for receiving in a given frequency band, comprising:
  n=4 antennas (1);
  an antenna tuning apparatus (3) for simultaneously tuning then antennas, the antenna tuning apparatus comprising n antenna ports, m=4 user ports and p adjustable impedance devices, where p is an integer greater than or equal to 2m=8, each of the adjustable impedance devices having a reactance at a frequency in said given frequency band, each of the antenna ports being coupled to one of the n antennas through a feeder, the reactance of any one of the adjustable impedance devices being adjustable by electrical means, each of the user ports delivering a signal;
  m single-input and single-output low-noise amplifiers (4), each of the user ports being coupled to an input port of one of the single-input and single-output low-noise amplifiers;
  m analog processing and conversion circuits (5), each of the single-input and single-output low-noise amplifiers having an output port which is coupled to an input port of one of the analog processing and conversion circuits, each of the analog processing and conversion circuits having an output which delivers a digital signal;
  a multiple-input signal processing device (6) processing the m digital signals delivered by the outputs of the analog processing and conversion circuits, the multiple-input signal processing device delivering a signal to a destination (7), the multiple-input signal processing device estimating quantities representative of a channel matrix between a plurality of signals sent by a transmitter and the m signals delivered by the user ports, the multiple-input signal processing device computing one or more quantities representative of a channel capacity as a function of said quantities representative of a channel matrix, and delivering a "tuning instruction" as a function of said one or more quantities representative of a channel capacity;
  a tuning control unit (9), the tuning control unit receiving the tuning instruction from the multiple-input signal processing device, the tuning control unit delivering "tuning control signals" to the antenna tuning apparatus, the tuning control signals being determined as a function of the tuning instruction, the reactance of each of the adjustable impedance devices being determined by one or more of the tuning control signals.

The antenna tuning apparatus (3) is an antenna tuning apparatus disclosed in the French patent application number 12/02542 of 25 Sep. 2012, entitled "Appareil d'accord d'antenne pour un réseau d'antennes à accès multiples" and in the corresponding international application PCT/IB2013/058423 (WO 2014/049475), of 10 Sep. 2013, entitled "Antenna tuning apparatus for a multiport antenna array". Thus, the antenna tuning apparatus (3) is such that the reactance of any one of the adjustable impedance devices has, at said frequency in said given frequency band, if the impedance matrix seen by the antenna ports is equal to a given diagonal impedance matrix, an influence on the impedance matrix presented by the user ports, and such that the reactance of at least one of the adjustable impedance devices has, at said frequency in said given frequency band, if the impedance matrix seen by the antenna ports is equal to the given diagonal impedance matrix, an influence on at least one non-diagonal entry of the impedance matrix presented by the user ports. This must be interpreted as meaning: the antenna tuning apparatus is such that, at said frequency in said given frequency band, there exists a diagonal impedance matrix referred to as the given diagonal impedance matrix, the given diagonal impedance matrix being such that, if an impedance matrix seen by the antenna ports is equal to the given diagonal impedance matrix, then (a) the reactance of any one of the adjustable impedance devices has an influence on an impedance matrix presented by the user ports, and (b) the reactance of at least one of the adjustable impedance devices has an influence on at least one non-diagonal entry of the impedance matrix presented by the user ports. In the two previous sentences, "an influence" could be replaced with "an effect".

The specialist understands that the antenna tuning apparatus (3) cannot be made up of a plurality of independent and uncoupled antenna tuning apparatuses each having a single antenna port and a single user port, because in this case, if the impedance matrix seen by the antenna ports is equal to any diagonal impedance matrix, then the impedance matrix presented by the user ports is a diagonal matrix, the non-diagonal entries of which cannot be influenced by anything.

Moreover, the antenna tuning apparatus (3) is such that, at said frequency in said given frequency band, if the impedance matrix seen by the antenna ports is equal to a given non-diagonal impedance matrix, a mapping associating the impedance matrix presented by the user ports to the p reactances is defined, the mapping having, at a given value of each of the p reactances, a partial derivative with respect to each of the p reactances, a span of the p partial derivatives being defined in the set of the complex matrices of size m×m considered as a real vector space, any diagonal complex matrix of size m×m having the same diagonal entries as at least one element of the span of the p partial derivatives. This must be interpreted as meaning: the antenna tuning apparatus is such that, at said frequency in said given frequency band, there exists a non-diagonal impedance matrix referred to as the given non-diagonal impedance matrix, the given non-diagonal impedance matrix being such that, if an impedance matrix seen by the antenna ports is equal to the given non-diagonal impedance matrix, then a mapping associating an impedance matrix presented by the user ports to the p reactances is defined, the mapping having, at a given value of each of the p reactances, a partial derivative with respect to each of the p reactances, a span of the p partial derivatives being defined in the set of the complex matrices of size m×m considered as a real vector space, any diagonal complex matrix of size m×m having the same diagonal entries as at least one element of the span of the p partial derivatives.

Thus, the specialist understands that any small variation in the impedance matrix of the antenna array, caused by a change in operating frequency or a change in the medium surrounding the antennas, can be at least partially compensated with a new adjustment of the adjustable impedance devices.

More generally, a specialist understands that, to obtain that any diagonal complex matrix of size m×m has the same diagonal entries as at least one element of the span of the p partial derivatives, it is necessary that the dimension of the span of the p partial derivatives considered as a real vector space is greater than or equal to the dimension of the subspace of the diagonal complex matrices of size m×m considered as a real vector space. Since the dimension of the span of the p partial derivatives considered as a real vector space is less than or equal to p, and since the dimension of the subspace of the diagonal complex matrices of size m×m considered as a real vector space is equal to 2m, the necessary condition implies that p is an integer greater than or equal to 2m. This is why the requirement "p is an integer greater than or equal to 2m" is an essential characteristic of the invention.

According to the invention, m digital signals, each mainly determined by one and only one of the signals delivered by the user ports, are processed to estimate one or more quantities representative of a channel matrix between a plurality of signals sent by a transmitter and the m signals delivered by the user ports, and to deliver a "tuning instruction" as a function of said one or more quantities representative of a channel matrix. The specialist understands that this is completely different from what is disclosed in said international application number PCT/SE2007/000776 and U.S. Pat. No. 8,059,058, where, as said above, a control signal is based on at least one channel parameter of the signals received by the antennas such as a measure of a correlation between open-circuit voltages delivered by the antennas. The specialist sees that the invention uses a feedback control system to determine the "tuning instruction", whereas said international application number PCT/SE2007/000776 and U.S. Pat. No. 8,059,058 use an open-loop control system to determine the control signal, which is much more difficult to implement because it requires an accurate model of the receiver. Thus, the invention overcomes this drawback of the prior art.

Moreover, since assessing one or more quantities representative of the channel matrix between a plurality of signals sent by a transmitter and the m signals delivered by the user ports is needed in closed-loop MIMO reception, the specialist understands that, according to the invention, no additional circuit and little additional signal processing are needed to deliver a "tuning instruction", compared to the circuits and signal processing used in a similar radio receiver which would not implement the invention, the block diagram of which would be identical to the one shown in FIG. 4, except that the tuning control unit (9) and the two corresponding links would not be present. The specialist understands that the opposite situation occurs in the antenna system disclosed in said international application number PCT/SE2007/000776 and U.S. Pat. No. 8,059,058, where, as said above, additional circuits and intensive additional signal processing are needed to obtain said at least one channel parameter of the signals received by the antennas. Thus, the invention overcomes this drawback of the prior art.

The specialist understands that, in order to compute said one or more quantities representative of a channel capacity, the multiple-input signal processing device (6) may estimate at least one quantity representative of a signal to noise ratio of reception. In this first embodiment, the adaptive process is such that, most of the time, the tuning instruction used for reception is a tuning instruction which, among a set of possible tuning instructions, produces values of said one or more quantities representative of a channel capacity which correspond to one of the largest channel capacities (or preferably, to the largest channel capacity).

Figure 1:
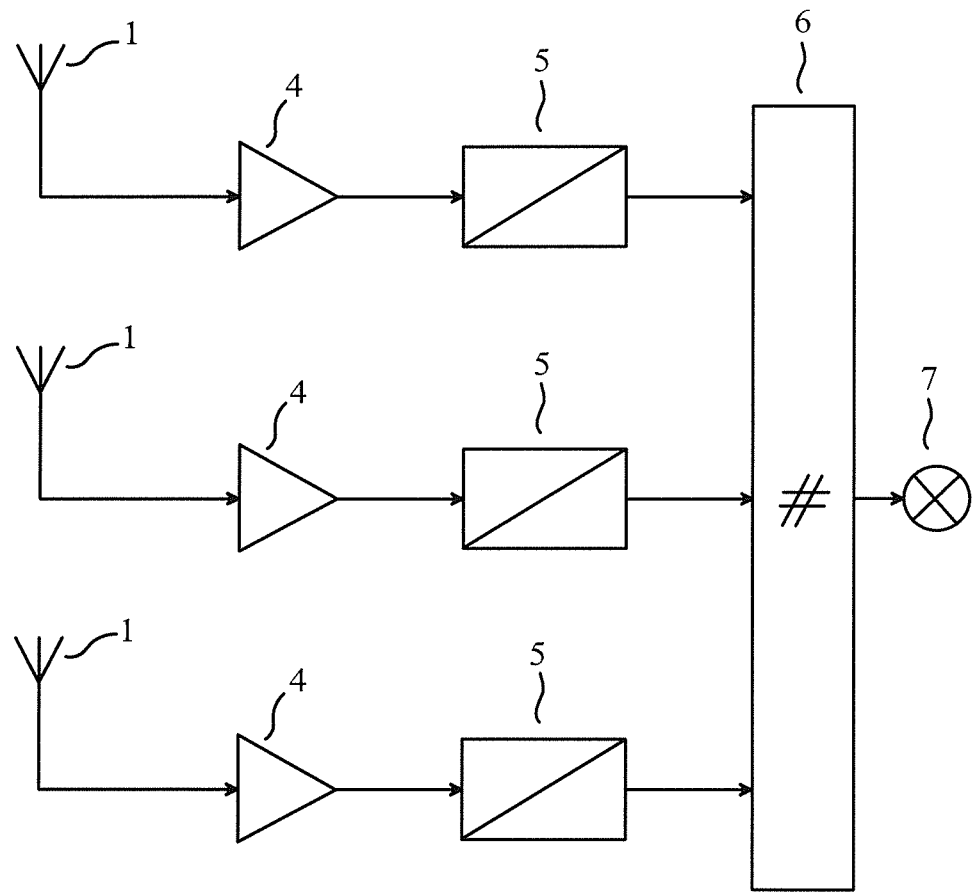
FIG. 1 shows the block diagram of a receiver for radio communication using several antennas, comprising as many independent analog channels as there are antennas, and has already been discussed in the section dedicated to the presentation of the prior art.
Figure 2:
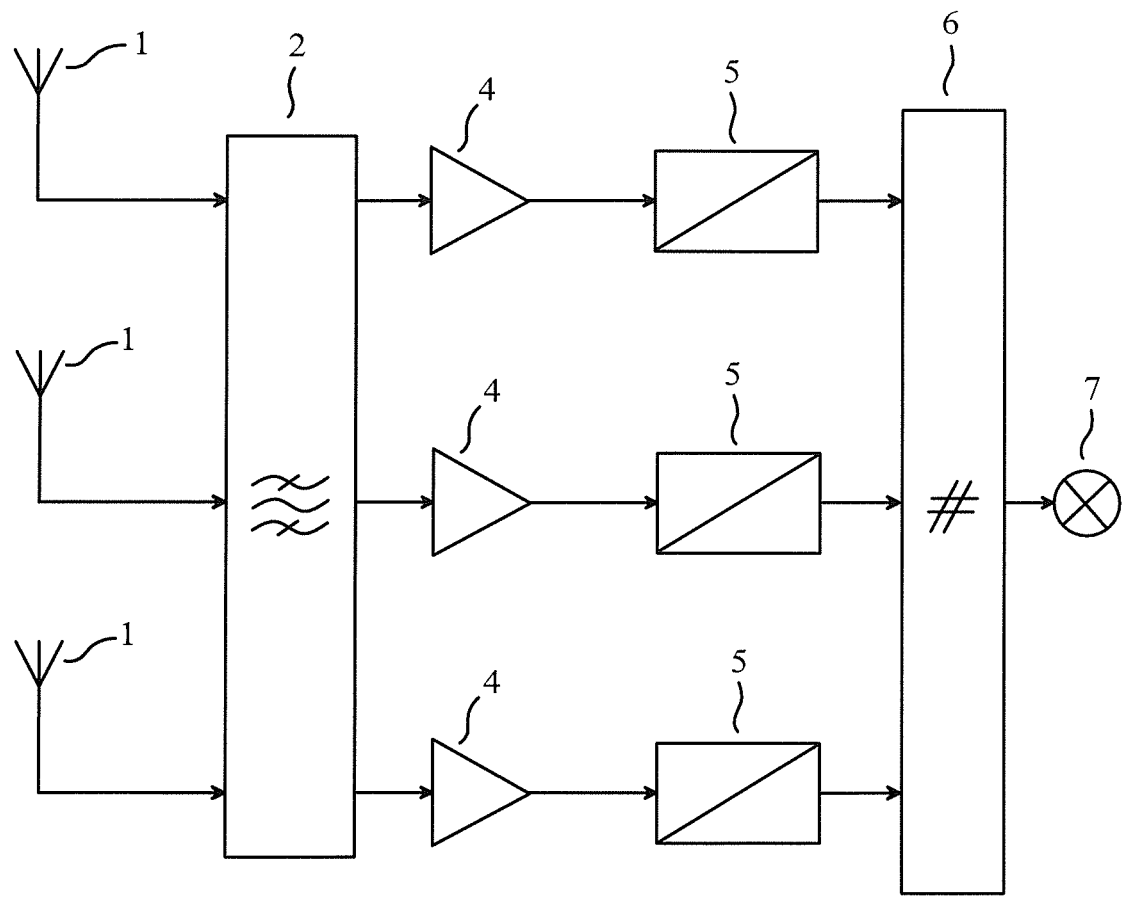
FIG. 2 shows the block diagram of a receiver for radio communication using several antennas, comprising a multiple-input-port and multiple-output-port passive linear matching network, and has already been discussed in the section dedicated to the presentation of the prior art.
Figure 3:
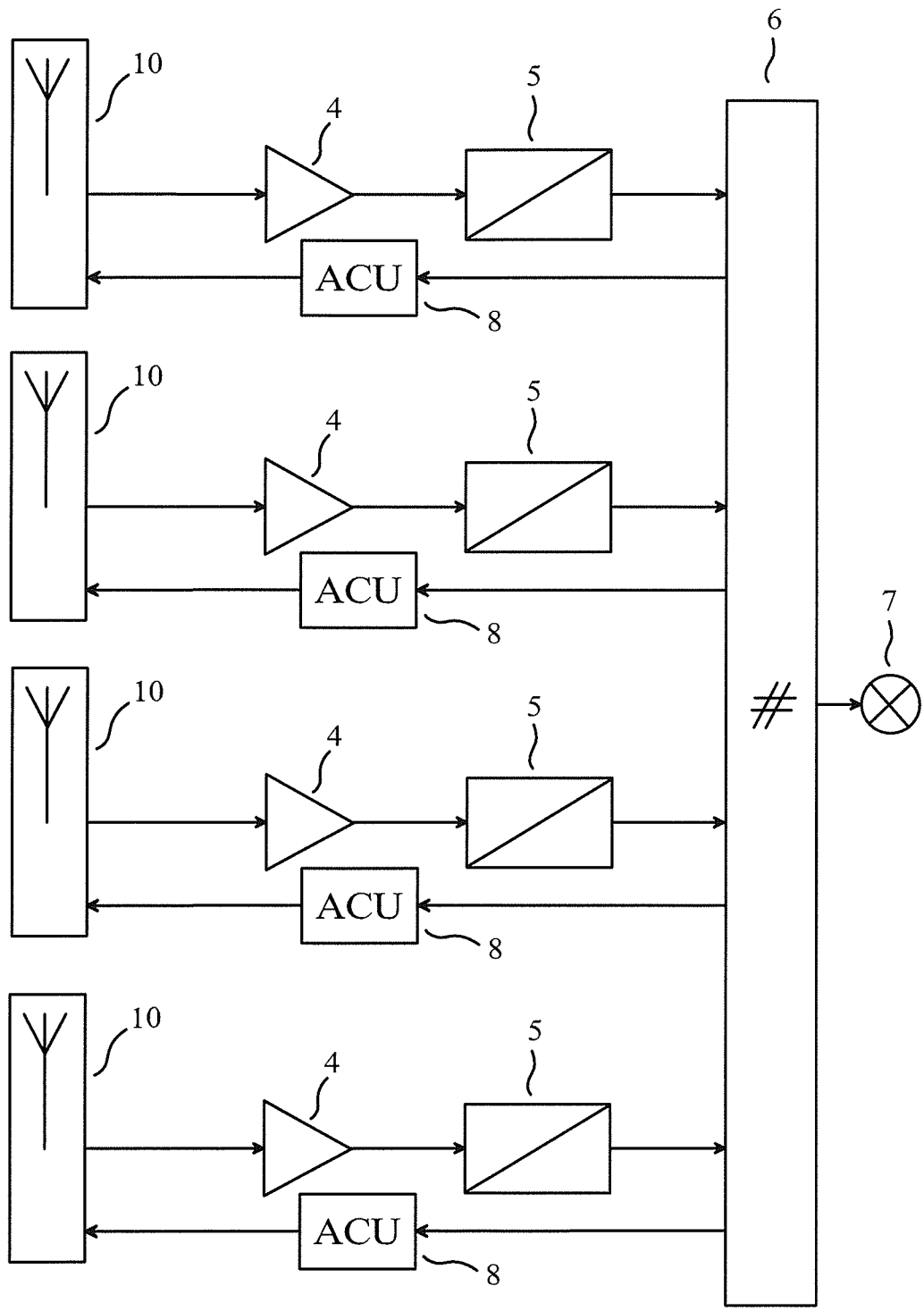
FIG. 3 shows the block diagram of a receiver for radio communication using several antenna systems such that the radiation pattern of each antenna system is adjustable by electrical means, and has already been discussed in the section dedicated to the presentation of the prior art.

Thus, the specialist understands that the receiver shown in FIG. 4 may provide a maximum power transfer, a signal decorrelation and optimum signal to noise ratios at the inputs of the analog processing and conversion circuits (5). Since an adaptive process is implemented, these wanted results are not sensitive to variations in the value of $Z_{ANT}$ for instance caused by a variation in the frequency of operation within a frequency band of intended operation, or by a variation in the electromagnetic characteristics of the volume surrounding the antennas. Also, the receiver shown in FIG. 4 does not require a large number of antennas or a wide spacing between them like the receiver shown in FIG. 3. Thus, the receiver shown in FIG. 4 effectively overcomes the limitations of the prior art.

Second Embodiment (Best Mode)

The second embodiment of a device of the invention, given by way of non-limiting example and best mode of carrying out the invention, also corresponds to the receiver for radio communication using an antenna tuning apparatus and a plurality of antennas represented in FIG. 4, and all explanations provided for the first embodiment are applicable to this second embodiment. Additionally, we have represented in FIG. 5 the antenna tuning apparatus (3) used in this second embodiment. This antenna tuning apparatus (3) comprises:

n=4 antenna ports (311) (321) (331) (341), each of the antenna ports being single-ended;

m=4 user ports (312) (322) (332) (342), each of the user ports being single-ended;

n adjustable impedance devices (301) each presenting a negative reactance and each being coupled in parallel with one of the antenna ports;

n(n−1)/2 adjustable impedance devices (302) each presenting a negative reactance and each having a first terminal coupled to one of the antenna ports and a second terminal coupled to one of the antenna ports which is different from the antenna port to which the first terminal is coupled;

n=m windings (303) each having a first terminal coupled to one of the antenna ports and a second terminal coupled to one of the user ports;

m adjustable impedance devices (304) each presenting a negative reactance and each being coupled in parallel with one of the user ports;

m(m−1)/2 adjustable impedance devices (305) each presenting a negative reactance and each having a first terminal coupled to one of the user ports and a second terminal coupled to one of the user ports which is different from the user port to which the first terminal is coupled.

It is possible that mutual induction exists between the windings (303). In this case, the inductance matrix of the windings is not a diagonal matrix.

Figure 5:
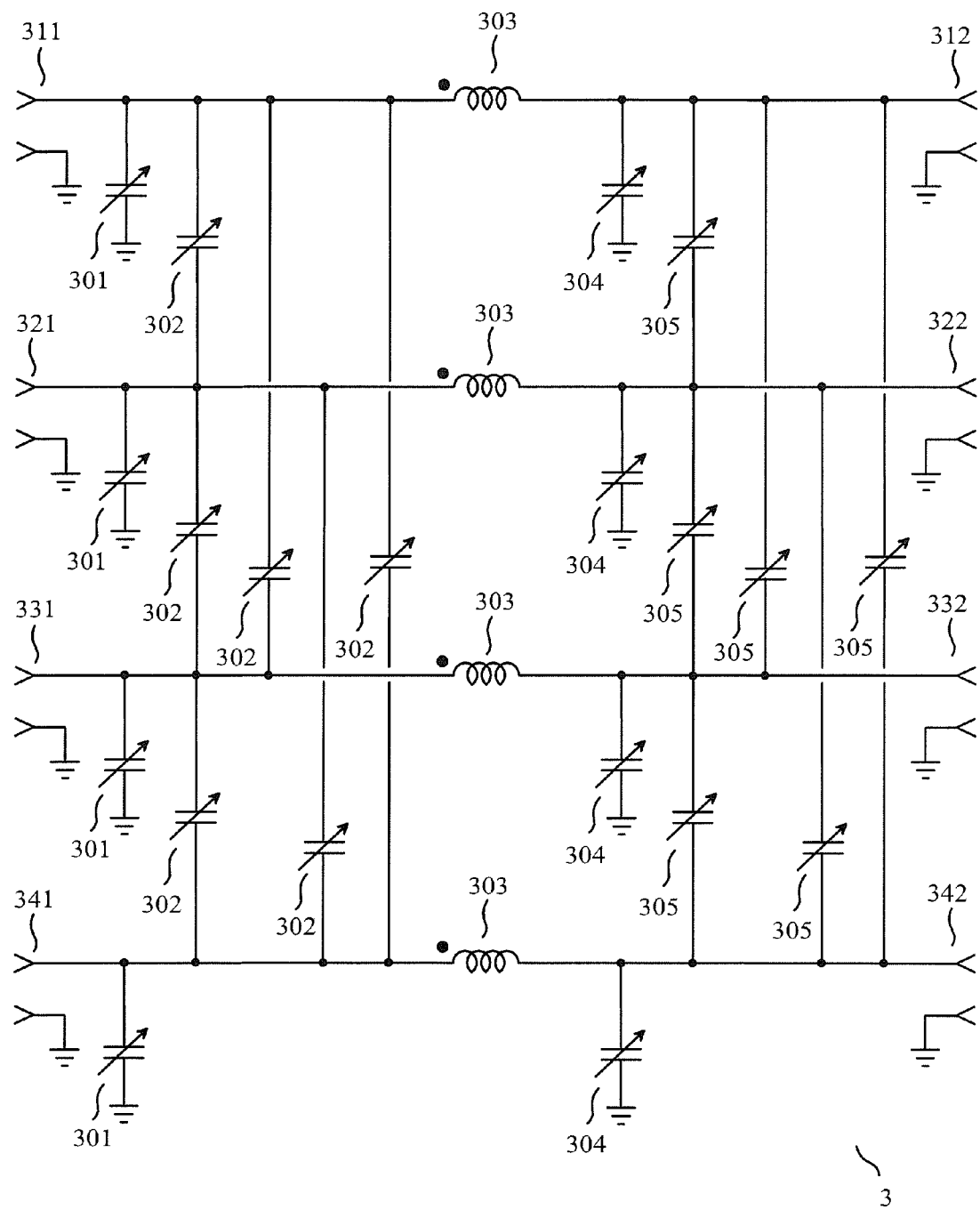
FIG. 5 shows a schematic diagram of an antenna tuning apparatus for simultaneously tuning 4 antennas, which may be used in the receiver for radio communication using an antenna tuning apparatus and a plurality of antennas shown in FIG. 4 (second embodiment)

All adjustable impedance devices (301) (302) (304) (305) are adjustable by electrical means, but the circuits and the control links needed to determine the reactance of each of the adjustable impedance devices are not shown in FIG. 5. In this second embodiment we have n=m and we use p=m (m+1)=20 adjustable impedance devices.

The specialist understands that, at a frequency at which the antenna tuning apparatus is intended to operate, if the impedance matrix seen by the antenna ports is a diagonal matrix having all its diagonal entries equal to 50Ω, the reactance of any one of the adjustable impedance devices has an influence on the impedance matrix presented by the user ports, and the reactance of one or more of the adjustable impedance devices has an influence on one or more of the non-diagonal entries of the impedance matrix presented by the user ports.

The impedance matrix seen by the antenna ports being a given symmetric complex matrix, it is possible to show that, for suitable component values, the p partial derivatives defined above are linearly independent in the real vector space of the complex matrices of size m×m, this vector space, denoted by E, being of dimension $2m^2$. Thus, the span of the p partial derivatives in E is a subspace of dimension p equal to the set of the symmetric complex matrices of size m×m. Here, any symmetric complex matrix of size m×m is an element of the span of the p partial derivatives. Consequently, any diagonal complex matrix of size m×m has the same diagonal entries as at least one element of the span of the p partial derivatives.

The reactance of an adjustable impedance device may depend on the ambient temperature, for some types of adjustable impedance devices. If such a type of adjustable impedance device is used in the antenna tuning apparatus, it is desirable that the tuning control signals are determined as a function of the tuning instruction and as a function of temperature, to compensate the effect of temperature on the reactance of each of the adjustable impedance devices.

The specialist understands that any small variation in the impedance matrix of the antenna array, caused by a change in operating frequency or a change in the medium surrounding the antennas, can be compensated with a new adjustment of the adjustable impedance devices. Thus, it is always possible to obtain the best performance. In particular, if the receiver is built in a portable transceiver, for instance a user equipment (UE) of an LTE wireless network, the body of the user has an effect on the channel matrix, and the channel matrix depends on the position of the body of the user. This is referred to as "user interaction", or "hand effect" or "finger effect". The specialist understands that the receiver for radio communication of the invention compensates the user interaction.

In this second embodiment, the adaptive process is implemented during one or more training sequences. The adaptive process is the following: during each of said training sequences, said one or more quantities representative of a channel capacity are computed for a finite set of tuning instructions, and a tuning instruction is selected, the selected tuning instruction being a tuning instruction for which said one or more quantities representative of a channel capacity correspond either to one of the largest channel capacities or, preferably, to the largest channel capacity. The tuning instruction selected during the latest completed training sequence is used for reception.

Third Embodiment

Figure 6:
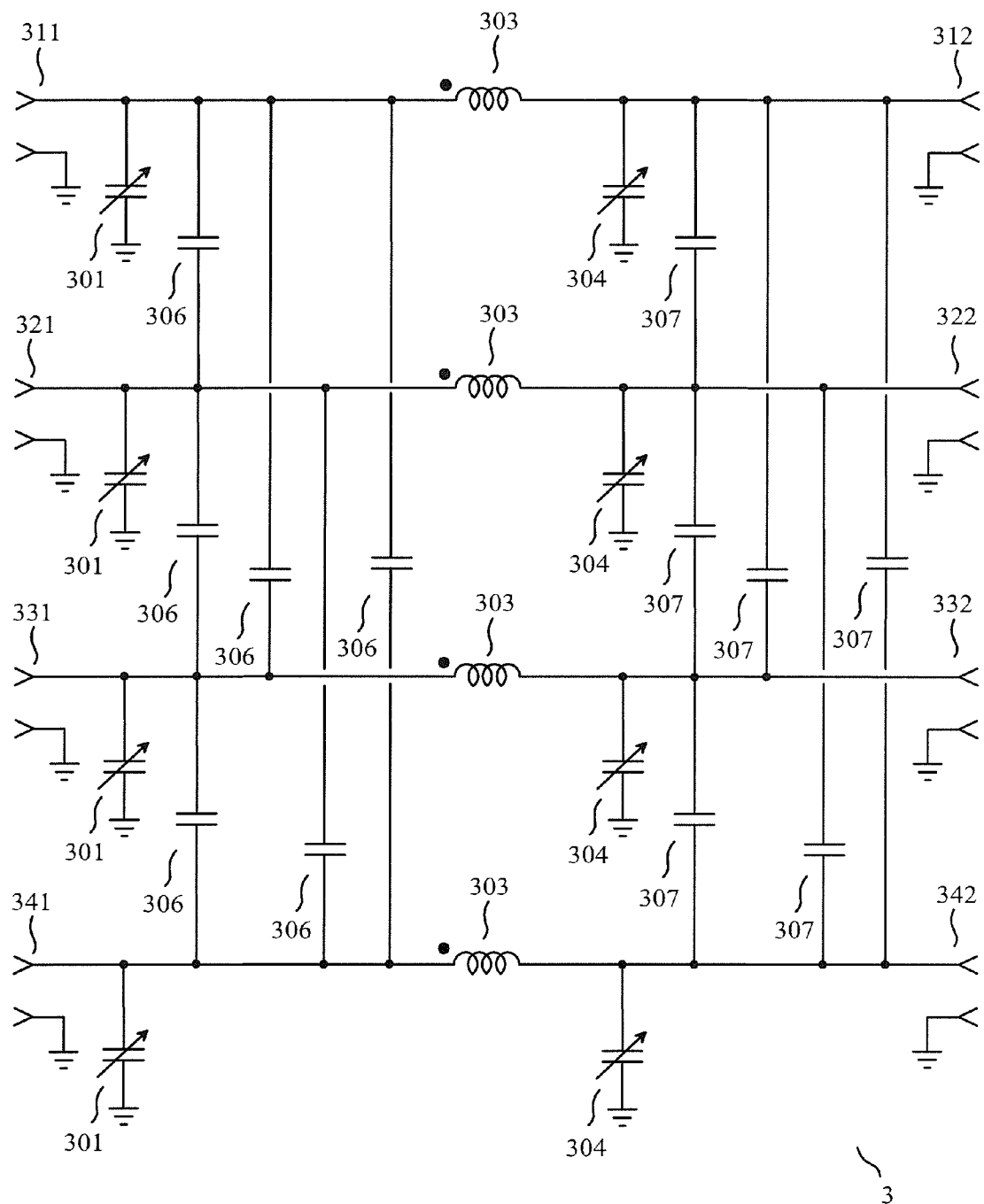
FIG. 6 shows a schematic diagram of an antenna tuning apparatus for simultaneously tuning 4 antennas, which may be used in the receiver for radio communication using an antenna tuning apparatus and a plurality of antennas shown in FIG. 4 (third embodiment).

The third embodiment of a device of the invention, given by way of non-limiting example, also corresponds to the receiver for radio communication using an antenna tuning apparatus and a plurality of antennas represented in FIG. 4, and all explanations provided for the first embodiment are applicable to this third embodiment. Additionally, we have represented in FIG. 6 the antenna tuning apparatus (3) used in this third embodiment. This antenna tuning apparatus (3) comprises:

n=4 antenna ports (311) (321) (331) (341), each of the antenna ports being single-ended;

m=4 user ports (312) (322) (332) (342), each of the user ports being single-ended;

n adjustable impedance devices (301) each presenting a negative reactance and each being coupled in parallel with one of the antenna ports;

n(n−1)/2 capacitors (306) each having a first terminal coupled to one of the antenna ports and a second terminal coupled to one of the antenna ports which is different from the antenna port to which the first terminal is coupled;

n=m windings (303) each having a first terminal coupled to one of the antenna ports and a second terminal coupled to one of the user ports;

m adjustable impedance devices (304) each presenting a negative reactance and each being coupled in parallel with one of the user ports;

m(m−1)/2 capacitors (307) each having a first terminal coupled to one of the user ports and a second terminal coupled to one of the user ports which is different from the user port to which the first terminal is coupled.

It is possible that mutual induction exists between the windings (303). All adjustable impedance devices (301) (304) are adjustable by electrical means, but the circuits and the control links needed to determine the reactance of each of the adjustable impedance devices are not shown in FIG. 6.

The specialist understands that, at a frequency at which the antenna tuning apparatus is intended to operate, if the impedance matrix seen by the antenna ports is a diagonal matrix having all its diagonal entries equal to 50Ω, the reactance of any one of the adjustable impedance devices has an influence on the impedance matrix presented by the user ports, and the reactance of one or more of the adjustable impedance devices has an influence on one or more of the non-diagonal entries of the impedance matrix presented by the user ports. For suitable components, it is possible to show that the p=8 partial derivatives defined above are linearly independent in the real vector space of dimension 32 of the complex matrices of size 4×4, denoted by E. Thus, the span of the p partial derivatives in E is of dimension 8. It is also possible to show that any diagonal complex matrix of size m×m has the same diagonal entries as at least one element of the span of the p partial derivatives.

The specialist understands that any small variation in the impedance matrix of the antenna array, caused by a change in operating frequency or a change in the medium surrounding the antennas, can be partially compensated with a new adjustment of the adjustable impedance devices. Thus, it is always possible to obtain a good performance.

In this third embodiment, an adaptive process is implemented during one or more training sequences. The adaptive process is the following: during each of said training sequences, a channel capacity is computed for a finite set of tuning instructions, and a tuning instruction producing the largest channel capacity is selected. The tuning instruction selected during the latest completed training sequence is used for reception.

In this third embodiment, the multiple-input signal processing device (6) performs correlations between known training sequences, sent by a transmitter during known time intervals, and the signals delivered by the user ports or signals each proportional to one of the signals delivered by the user ports, to estimate the quantities representative of a channel matrix between a plurality of signals sent by a transmitter and the m signals delivered by the user ports. The specialist understands how such a method can be implemented. For instance, said transmitter using several transmitting antennas, one of said training sequences may comprise a plurality of quasi-orthogonal or orthogonal signals, each of said quasi-orthogonal or orthogonal signals being used as one of the signals sent by said transmitter, each of said quasi-orthogonal or orthogonal signals being sent through one and only one of said transmitting antennas used by said transmitter.

If the capacitors (306) (307) have a value equal to 0 pF (or are not present in the circuit shown in FIG. 6), and if mutual induction does not exist between the windings (303), we see that the antenna tuning apparatus (3) comprising n=4 antenna ports and m=4 user ports is in fact composed of 4 single-input-port and single-output-port antenna tuning apparatuses.

In this case, the method of the invention becomes a method for radio reception with multiple antennas in a given frequency band, using N antennas, where N is an integer greater than or equal to 2, comprising the steps of:

tuning n antennas among the N antennas, where n is an integer greater than or equal to 2 and less than or equal to N, using n antenna tuning apparatuses, each of said antenna tuning apparatuses comprising one antenna port, one user port, and two or more adjustable impedance devices, each of the adjustable impedance devices of said each of said antenna tuning apparatuses having a reactance at a frequency in said given frequency band, the reactance of any one of the adjustable impedance devices being adjustable by electrical means, each of the user ports delivering a signal;

processing n digital signals, each of the digital signals being mainly determined by one and only one of the signals delivered by the user ports, to estimate one or more quantities representative of a channel matrix between a plurality of signals sent by a transmitter and the n signals delivered by the user ports, and to deliver a "tuning instruction" as a function of said one or more quantities representative of a channel matrix;

using the tuning instruction to obtain a plurality of "tuning control signals", the reactance of each of the adjustable impedance devices being mainly determined by one or more of the tuning control signals.

A receiver implementing this method is a receiver for radio reception with multiple antennas using N antennas in a given frequency band, where N is an integer greater than or equal to 2, comprising:

n antenna tuning apparatuses, where n is an integer greater than or equal to 2 and less than or equal to N, each of said antenna tuning apparatuses comprising one antenna port, one user port, and two or more adjustable impedance devices, each of the adjustable impedance devices of said each of said antenna tuning apparatuses having a reactance at a frequency in said given frequency band, the reactance of any one of the adjustable impedance devices being adjustable by electrical means, each of the user ports delivering a signal;

a multiple-input signal processing device processing n digital signals, each of the digital signals being mainly determined by one and only one of the signals delivered by the user ports, the multiple-input signal processing device estimating one or more quantities representative of a channel matrix between a plurality of signals sent by a transmitter and the n signals delivered by the user ports, the multiple-input signal processing device delivering a "tuning instruction" as a function of said one or more quantities representative of a channel matrix;

a tuning control unit, the tuning control unit receiving the tuning instruction from the multiple-input signal processing device, the tuning control unit delivering a plurality of "tuning control signals" to the antenna tuning apparatuses, the tuning control signals being determined as a function of the tuning instruction, the reactance of each of the adjustable impedance devices being mainly determined by one or more of the tuning control signals.

Each of said n antenna tuning apparatuses may be such that the reactance of any one of the adjustable impedance devices of said each of said antenna tuning apparatuses has, at said frequency in said given frequency band, if the impedance seen by the antenna port of said each of said antenna tuning apparatuses is equal to a given impedance, an influence on the impedance presented by the user port of said each of said antenna tuning apparatuses. This must be interpreted as meaning: each of said n antenna tuning apparatuses may be such that, at said frequency in said given frequency band, there exists an impedance referred to as the given impedance, the given impedance being such that, if the impedance seen by the antenna port of said each of said antenna tuning apparatuses is equal to the given impedance, then the reactance of any one of the adjustable impedance devices of said each of said antenna tuning apparatuses has an influence on the impedance presented by the user port of said each of said antenna tuning apparatuses.

The antenna port of each of said n antenna tuning apparatuses is intended to be coupled, directly or through a feeder, to one of said n antennas among the N antennas.

INDICATIONS ON INDUSTRIAL APPLICATIONS

The invention is suitable for radio reception using multiple antennas, for instance implementing receiver spatial diversity, space-time decoding or spatial demultiplexing. Thus, the invention is suitable for MIMO radio communication.

The invention provides the best possible characteristics using very close antennas, hence presenting a strong interaction between the antennas. The invention is therefore particularly suitable for mobile radio receivers, for instance those used in portable radiotelephones or portable computers.

The invention provides the best possible characteristics using a very large number of antennas in a given volume, hence presenting a strong interaction between the antennas. The invention is therefore particularly suitable for high-performance radio receivers, for instance those used in the fixed stations of cellular radiotelephony networks.

A radio receiver of the invention may be used in a device which also comprises a radio transmitter having one or more parts in common with the radio receiver of the invention. For instance, one or more antennas and/or an antenna tuning apparatus used in a radio receiver of the invention may also be a part of a radio transmitter.

The invention claimed is:

1. A method for radio reception with multiple antennas in a given frequency band, using N antennas, where N is an integer greater than or equal to 2, the method comprising the steps of:
    tuning n antennas among the N antennas, where n is an integer greater than or equal to 2 and less than or equal to N, using an antenna tuning apparatus comprising n antenna ports, m user ports, where m is an integer greater than or equal to 2, and p adjustable impedance devices, where p is an integer greater than or equal to 2m, each of the adjustable impedance devices having a reactance at a frequency in the given frequency band, the reactance of any one of the adjustable impedance devices being adjustable by electrical means, each of the user ports delivering a signal;
    processing m digital signals, each of the digital signals being mainly determined by one and only one of the signals delivered by the user ports, to estimate one or more quantities representative of a channel matrix between a plurality of signals sent by a transmitter and the m signals delivered by the user ports, and to deliver a tuning instruction as a function of said one or more quantities representative of a channel matrix;
    using the tuning instruction to obtain a plurality of tuning control signals, the reactance of each of the adjustable impedance devices being mainly determined by one or more of the tuning control signals.

2. The method of claim 1, wherein the antenna tuning apparatus is such that, at said frequency in the given frequency band, there exists a diagonal impedance matrix referred to as the given diagonal impedance matrix, the given diagonal impedance matrix being such that, if an impedance matrix seen by the antenna ports is equal to the given diagonal impedance matrix, then the reactance of any one of the adjustable impedance devices has an influence on an impedance matrix presented by the user ports.

3. The method of claim 2, wherein the antenna tuning apparatus is such that, at said frequency in the given frequency band, if the impedance matrix seen by the antenna ports is equal to the given diagonal impedance matrix, then the reactance of at least one of the adjustable impedance devices has an influence on at least one non-diagonal entry of the impedance matrix presented by the user ports.

4. The method of claim 1, wherein the antenna tuning apparatus is made up of n antenna tuning apparatuses each comprising one of said antenna ports, one of said user ports, and two or more of said adjustable impedance devices.

5. The method of claim 1, wherein each of the antenna ports is coupled, directly or through a feeder, to one of said n antennas among the N antennas.

6. A receiver for radio reception with multiple antennas using N antennas in a given frequency band, where N is an integer greater than or equal to 2, the receiver comprising:
    an antenna tuning apparatus for tuning n antennas among the N antennas, where n is an integer greater than or equal to 2 and less than or equal to N, the antenna tuning apparatus comprising n antenna ports, m user ports and p adjustable impedance devices, where m is an integer greater than or equal to 2 and p is an integer greater than or equal to 2m, each of the adjustable impedance devices having a reactance at a frequency in the given frequency band, the reactance of any one of the adjustable impedance devices being adjustable by electrical means, each of the user ports delivering a signal;
    a multiple-input signal processing device processing m digital signals, each of the digital signals being mainly determined by one and only one of the signals delivered by the user ports, the multiple-input signal processing device estimating one or more quantities representative of a channel matrix between a plurality of signals sent by a transmitter and the m signals delivered by the user ports, the multiple-input signal processing device delivering a tuning instruction as a function of said one or more quantities representative of a channel matrix;
    a tuning control unit, the tuning control unit receiving the tuning instruction from the multiple-input signal processing device, the tuning control unit delivering a plurality of tuning control signals to the antenna tuning apparatus, the tuning control signals being determined as a function of the tuning instruction, the reactance of each of the adjustable impedance devices being mainly determined by one or more of the tuning control signals.

7. The receiver for radio reception with multiple antennas of claim 6, wherein the antenna tuning apparatus is such that, at said frequency in the given frequency band, there exists a diagonal impedance matrix referred to as the given diagonal impedance matrix, the given diagonal impedance matrix being such that, if an impedance matrix seen by the antenna ports is equal to the given diagonal impedance matrix, then the reactance of any one of the adjustable impedance devices has an influence on an impedance matrix presented by the user ports.

8. The receiver for radio reception with multiple antennas of claim 7, wherein the antenna tuning apparatus is such that, at said frequency in the given frequency band, if the impedance matrix seen by the antenna ports is equal to the given diagonal impedance matrix, then the reactance of at least one of the adjustable impedance devices has an influence on at least one non-diagonal entry of the impedance matrix presented by the user ports.

9. The receiver for radio reception with multiple antennas of claim 6, wherein the antenna tuning apparatus is made up of n antenna tuning apparatuses each comprising one of said antenna ports, one of said user ports, and two or more of said adjustable impedance devices.

10. The receiver for radio reception with multiple antennas of claim 6, wherein each of the antenna ports is coupled, directly or through a feeder, to one of said n antennas among the N antennas.

11. The receiver for radio reception with multiple antennas of claim 6, wherein the multiple-input signal processing device computes one or more quantities representative of a channel capacity as a function of said quantities representative of a channel matrix, and delivers the tuning instruction as a function of said one or more quantities representative of a channel capacity.

12. The receiver for radio reception with multiple antennas of claim 6, wherein an adaptive process is implemented during one or more training sequences.

13. The receiver for radio reception with multiple antennas of claim 12, wherein one of said training sequences comprises a plurality of quasi-orthogonal or orthogonal signals.

14. The receiver for radio reception with multiple antennas of claim 12, wherein the multiple-input signal processing device computes one or more quantities representative of a channel capacity as a function of said quantities representative of a channel matrix, and wherein, during each of said training sequences, said one or more quantities representative of a channel capacity are computed for a finite set of tuning instructions, and a tuning instruction is selected, the selected tuning instruction being a tuning instruction for which said one or more quantities representative of a channel capacity correspond to the largest channel capacity.

15. The receiver for radio reception with multiple antennas of claim 14, wherein the tuning instruction selected during the latest completed training sequence is used for reception.

16. The receiver for radio reception with multiple antennas of claim 6, wherein the antenna tuning apparatus is such that, at said frequency in the given frequency band, there exists a non-diagonal impedance matrix referred to as the given non-diagonal impedance matrix, the given non-diagonal impedance matrix being such that, if an impedance matrix seen by the antenna ports is equal to the given non-diagonal impedance matrix, then a mapping associating an impedance matrix presented by the user ports to the p reactances is defined, the mapping having, at a given value of each of the p reactances, a partial derivative with respect to each of the p reactances, a span of the p partial derivatives being defined in the set of the complex matrices of size m×m considered as a real vector space, any diagonal complex matrix of size m×m having the same diagonal entries as at least one element of the span of the p partial derivatives.

17. The receiver for radio reception with multiple antennas of claim 16, wherein the p partial derivatives are linearly independent in the real vector space of the complex matrices of size m×m.

18. The receiver for radio reception with multiple antennas of claim 16, wherein any symmetric complex matrix of size m×m is an element of the span of the p partial derivatives.

* * * * *